Sept. 30, 1969 E. A. SALO 3,470,459
ASYNCHRONOUS LOAD LIMITING TRANSFORMER
Filed March 20, 1967 3 Sheets-Sheet 1

INVENTOR.
ERIC A. SALO
BY Naylor & Neal
ATTORNEYS

United States Patent Office 3,470,459
Patented Sept. 30, 1969

3,470,459
ASYNCHRONOUS LOAD LIMITING
TRANSFORMER
Eric A. Salo, San Lorenzo, Calif., assignor to Eryx
Corporation, San Lorenzo, Calif., a corporation
of California
Filed Mar. 20, 1967, Ser. No. 624,533
Int. Cl. H02p 13/08, 13/10; H02m 5/12
U.S. Cl. 323—52                                    8 Claims

ABSTRACT OF THE DISCLOSURE

Apparatus for the interchange of electrical energy from a primary circuit to a secondary circuit including rotor and stator cores, a shaft bearing the rotor core, and selectively operable means for shifting the shaft longitudinally, locking the shaft against rotation, drivably rotating the shaft, and permitting free rotation of the shaft.

Apparatus embodying the subject invention comprises electromechanical elements functionally combined to provide for the interchange of electrical energy from a first electrical circuit to a second electrical circuit, the two circuits being at different and relatively fixed voltages as is the case with conventional transformer-interconnected circuits. With apparatus embodying the subject invention, the electrical frequency of the primary circuit need not, however, be the same as that of the secondary circuit. This capability for asynchronous operation serves an important purpose and object in connection with power networks which conventionally are synchronous. Because of their synchronous nature, extensive electrical networks of this type are very vulnerable to collapse from transient conditions which reduce system frequency even in very slight amount. Such a slight reduction in system frequency can result in a sufficient reduction of the capability of steam electric sources of energy to cause total collapse of the overall system, such as occurred on the eastern network in November 1965. The asynchronous feature of apparatus embodying the subject invention makes it possible and practical to supply a large network from a source of energy without imposing a transient low frequency of the network upon the energy source.

These and other objects of the invention will be apparent from the following description taken in conjunction with the drawings forming part of this specification, and in which.

Figure 4:
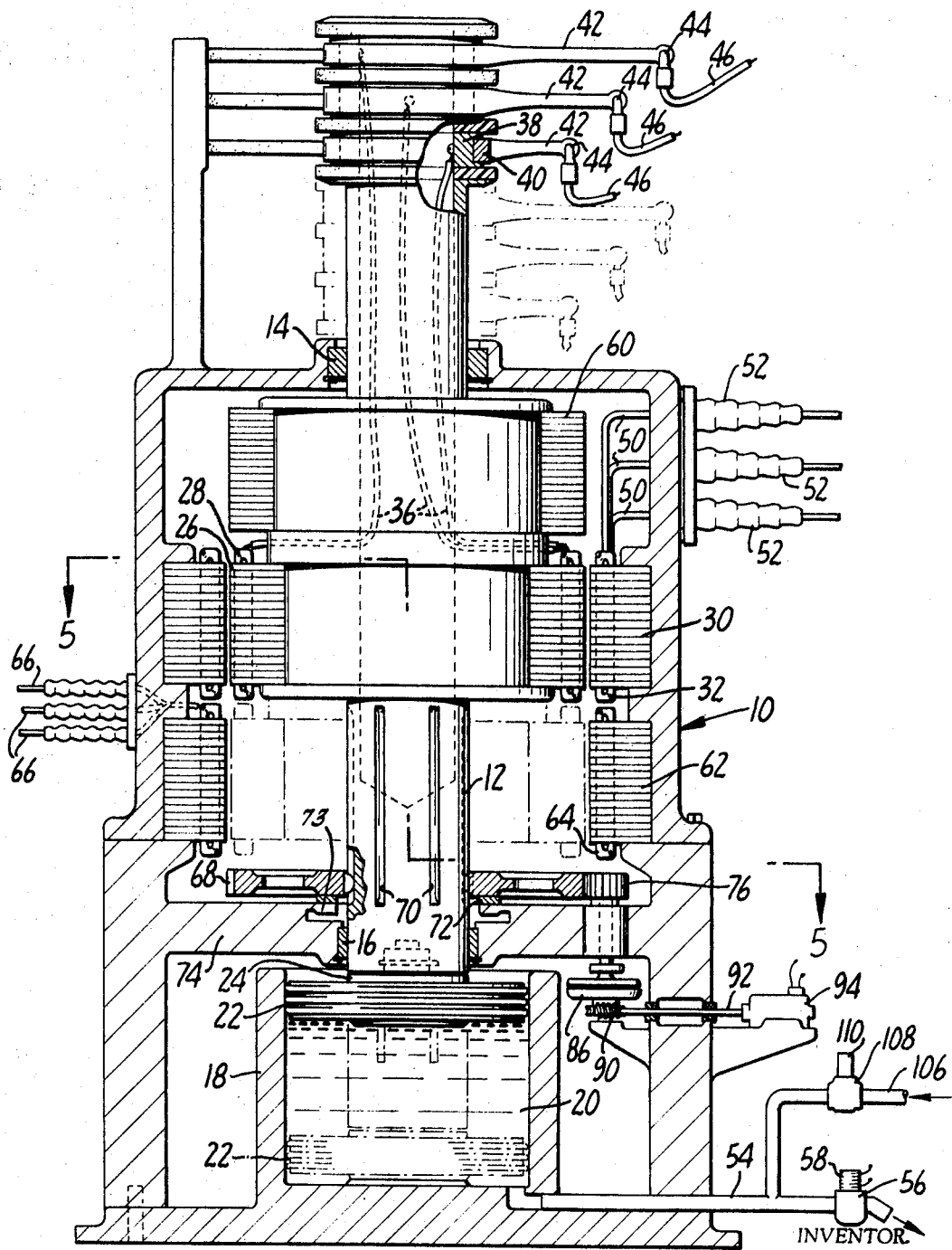
FIG. 4 is an enlarged view in vertical diametral section of the apparatus of FIG. 1.
Figure 5:
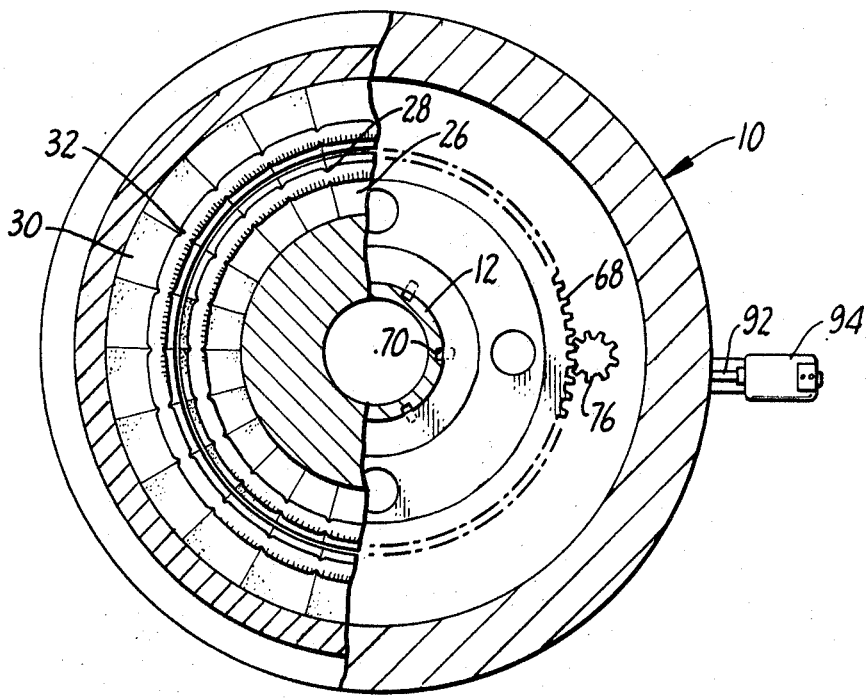
FIG. 5 is a view taken along lines 5—5 of FIG. 4.

Referring to the drawings, and in particular to FIG. 4, the subject device comprises a housing 10, a rotor shaft 12 therein rotatably and slidably supported by bearings 14 and 16, and means for supporting said shaft including a hydraulic cylinder 18, a hydraulic fluid 20 under pressure in the cylinder, a hydraulic piston 22, and a bearing 24 constituting a connector between shaft and piston enabling rotational movement of the shaft without imparting such movement to the piston.

Shaft 12 carries a laminated magnetic core 26 provided with a polyphase electrical winding 28. Stationed within the housing in normal mechanical and magnetic alignment with core 26 is another laminated magnetic core 30 provided with a polyphase electrical winding 32. When so positionally related, these cores with their windings perform and function in the manner of a conventional transformer, winding 28 serving as the primary, or low voltage, winding, and winding 32 as the secondary, or high voltage, winding. Both sets of windings are distributed peripherally on the magnetic cores, similar to the windings of induction motors, with a comparable revolving field rotating around the magnetic circuit having its axis of rotation in alignment with the longitudinal axis of shaft 12. The phase sequences in windings 28 and 32 are the same in rotational direction so that with the same frequency on the primary circuit as on the secondary circuit there is no rotational effect of the stationary winding 32 relative to the rotatable winding 28. With the rotor shaft 12 locked in position and with the revolving field induced by either winding in register with the other winding, the device performs just as a conventional electrical transformer and delivers output voltage in the ratio of the respective turns of the windings and at the same frequency.

Figure 1:
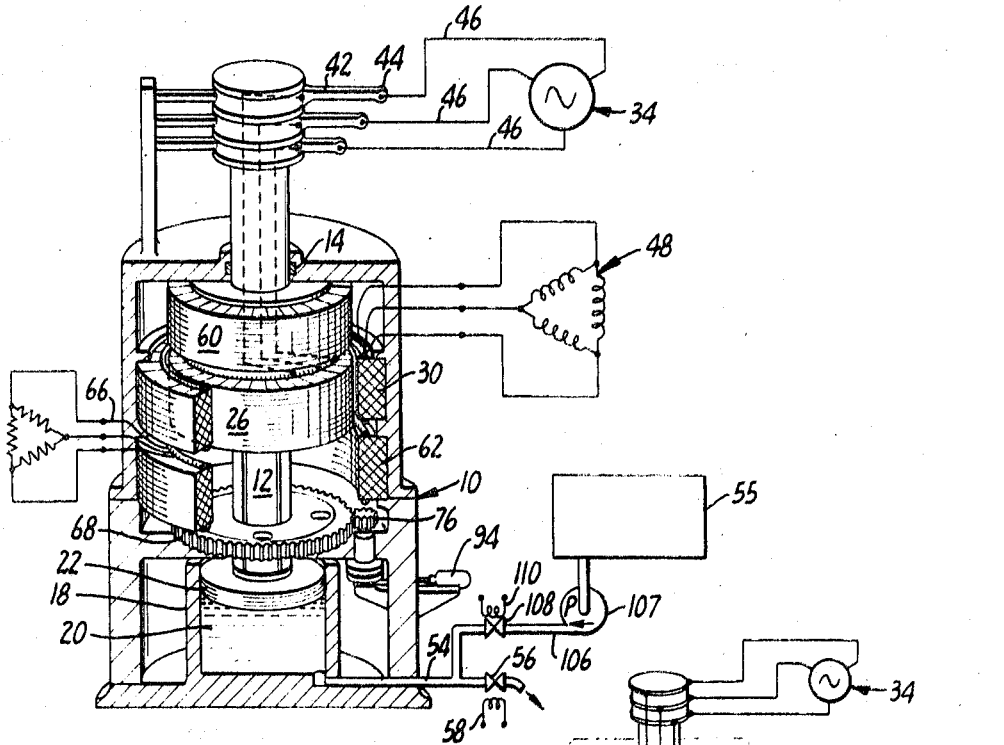
FIG. 1 is a view in perspective of an embodiment of the subject apparatus in one condition of operation, parts thereof being shown in section.
Figure 2:
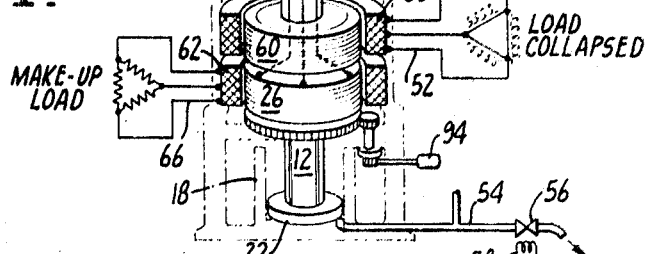
FIG. 2 is a view similar to that of FIG. 1, but in reduced scale, showing the apparatus in a second condition of operation.
Figure 3:
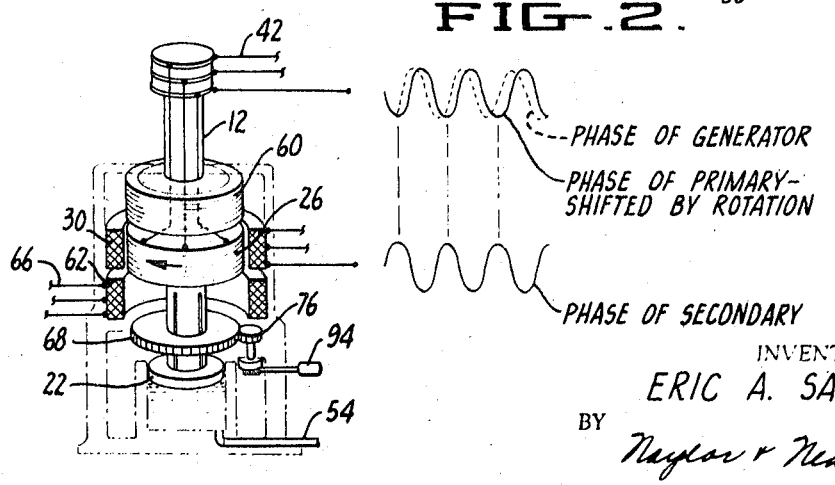
FIG. 3 is a view similar to that of FIG. 2 showing the apparatus in a third condition of operation.

Electrical connection between the power circuit (FIG. 1) and the primary winding 28 is effected by means comprising insulated electrical leads 36 which extend through bored openings in the rotor shaft 12 and up to the upper end of the shaft. At the upper end of shaft 12 the leads 36 are connected to insulated rotatable bands 38 which are rotatably associated with collector rings 40, the latter having arms 42 provided with terminals 44 to which the flexible insulated power supply cables 46 are connected. The secondary winding 32 is connected to the load circuit 48 by leads 50 which extend by way of electrical insulating bushings 52 through suitable openings formed in the housing 10.

The device includes means for interrupting the energy interchange between the primary and secondary circuits, thereby obviating the need for and the use of electrical circuit breakers to accomplish circuit segregation, said means comprising fluid conduit 54 interconnecting the interior of hydraulic cylinder 18 and a fluid reservoir 55; a normally closed valve 56 in conduit 54; and a control solenoid 58 adapted upon energization to open the valve 56 and discharge the hydraulic fluid 20 to the fluid reservoir. Means, not shown, are provided to energize solenoid 58 pursuant to receipt of a signal indicating a need to effect a breaking of the electrical connection between power circuit 34 and load circuit 48. Upon the opening of valve 56, piston 22 and rotor shaft 12 carried thereby are rapidly lowered toward the bottom of cylinder 18 in response to removal of the hydraulic support cushion constituted by hydraulic fluid 20. This downward movement of the rotor shaft lowers core 26 and its winding 28 below stator core and its winding 32, thereby both magnetically and mechanically disconnecting the primary and secondary circuits.

Disposed on rotor shaft 12 is a magnetic core 60 which is in vertical alignment with core 26. When the shaft 12 is in the described lowered position, core 60, which may or may not be provided with an auxiliary winding, is in radial alignment with core 30 and this serves to complete the magnetic circuit with core 30, thereby preventing an excessive change in the electrical reactance of winding 32. An excessive change in reactance of winding 32 would otherwise occur upon the lowering of the rotor shaft to mechanically and magnetically disconnect the primary rotor core and its winding from the stator core and winding.

A second stationary core 62 is provided in housing 10 in vertical alignment with core 30 so that upon the lowering of the rotor shaft the magnetic circuit of core 26 is completed. As a consequence the electrical reactance of the primary winding 28 is not subject to excessive change as a result of displacement from the magnetic circuit of stator core 30. Core 62 is provided with an auxiliary winding 64 which is connected to another load circuit, not shown, through leads 66, said load circuit being a substitute for load circuit 48 of the coil 32. The substituted external load is sufficiently high so that in case the rotor shaft is dropped instantaneously to its lowered position the power supply 34 in the primary circuit is not reduced to zero load with the attendant difficulties resulting therefrom, but instead an appreciable auxiliary load is provided instantly to keep the power supply 34 from tripping out on 100% load rejection, as is common with power equipment.

Figure 6:
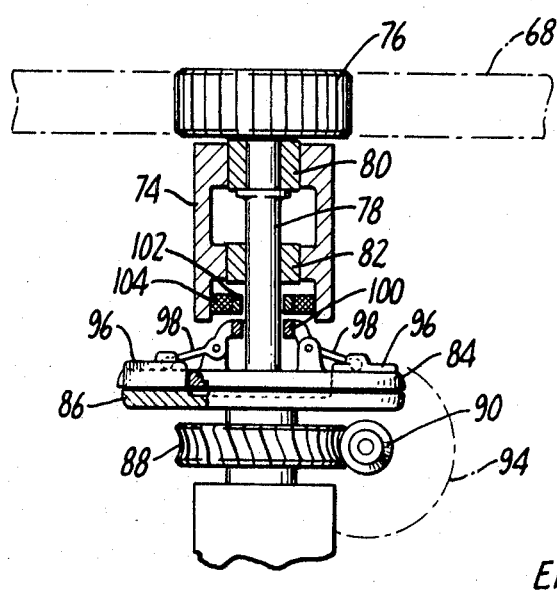
FIG. 6 is an enlarged detail view of one form of system for mechanically driving and braking the rotor element of the subject apparatus.

Means are provided to enable rotational positioning of rotor shaft 12 and to enable the locking of the shaft against rotation. Said means comprises ring gear 68, the hub opening of which is provided with axial, vertical grooves to define splines which interfit with rotor shaft spline grooves 70, thereby locking the ring gear to the rotor shaft for joint rotational movement while permitting longitudinal sliding movement of the rotor shaft relative to the ring gear. Gear 68 is supported in position by bearing 72 which in turn is held in position by horizontal diaphragm 73 of housing 10. Gear 68 is disposed in mesh with spur gear 76, the latter being secured to shaft 78 which is supported and mounted for rotation in bearings 80 and 82 disposed within housing diaphragm 74 (FIG. 6). Secured to the lower end of shaft 78 is a mechanical clutch plate 84 which is in rotational alignment with clutch plate 86, the latter being fixedly secured to worm gear 88. In driving engagement with worm gear 88 is worm 90 which is secured to the output shaft 92 of a reversible electric motor 94. Clutch plates 84 and 86 are adapted to be secured together by friction lock dogs 96 which are operated by linkage 98. Such operation of linkage 98 occurs when the magnetic yoke 100 carried thereby moves upwardly in response to a magnetic field established by magnetic core 102 when solenoid 104 is electrically energized.

When the clutch plates 84 and 86 are connected together and motor 94 is inoperative, the worm gear to worm connection 88, 90, acting through the ring gear to spur gear connection 68, 76 and the spline connection between the ring gear and shaft 12, locks shaft 12 against rotation. This condition is maintained when and while solenoid 104 is energized. When clutch plates 84 and 86 are disconnected, i.e., when and while solenoid 104 is de-energized, rotor shaft 12 is free to rotate.

When the rotor shaft is in its raised position and solenoid 104 is de-energized, primary and secondary windings 28 and 32 are driven into magnetic angular alignment by the rotation of the common magnetic field. When the frequency of the primary, source, circuit is exactly the same as the frequency of the secondary, load, circuit, there is no angular movement of the rotor shaft. When this condition obtains, solenoid 104 is energized to lock the rotor in its stationary condition by means, not shown, providing an energizing signal responsive to the existence of the synchronous frequency condition. During this condition of operation of the subject device, it performs in the manner of a static transformer.

When the frequency of the secondary circuit decays to the point where the generation capability connected to the primary circuit is imperiled, solenoid 104 is de-energized, either manually or, preferably, automatically, permitting free rotation of shaft 12, thereby relieving the primary circuit of incipient overload while permitting the full capability of the primary circuit to supply the overloaded secondary circuit, rather than tripping out on low frequency and aggravating the generation deficiency as is presently and conventionally the case.

The capability of the apparatus for synchronous operation can be utilized in a quick and safe manner for connecting a synchronous generator onto an active, loaded circuit. Normally, this is done by carefully adjusting the mechanical speed of the oncoming generator and matching voltages of load and generator, and by doing this at a time which is as close as possible to the point when there is synchronous speed and precisely matching phase relationships, at which point the connecting switches are closed to obtain connection with the load. With the subject apparatus, the oncoming generator can be switched into the primary circuit as soon as the frequency of the generator and the load are within a small percentage of each other. The only substantial disturbance will be the transistory loading necessary to accelerate the rotor shaft to the rotational speed corresponding to the difference in frequency, which difference in frequency will normally be small. Complete synchronization can be obtained by braking the angular rotation of the rotor shaft by gradually increasing the field strength of the solenoid 104. In this way the locked rotor synchronous operation can be reached without imposing upon the operation the meticulous care which is required to synchronize conventionally used equipment and without exposing the electrical system to the drastic disturbance resulting from the closing of switches to connect a major generator with a comparable load under the circumstances of an out of phase relationship.

The subject apparatus serves to stabilize a large electrical system under conditions of overload where the system frequency degenerates to the point where power plant output is reduced because of operation at lowered speeds. Upon the occurrence of such a situation where the system overload approaches a low frequency condition, the rotor shaft of the subject apparatus becomes unlocked, either automatically by relay action or manually, and the full output of a generator or plant connected to the primary circuit can be utilized at its normal frequency regardless of an abnormal frequency on the secondary side of the equipment.

To restore the rotor shaft to its raised position, hydraulic fluid 20 is returned to the cylinder 18 from the fluid reservoir 55 through supply conduit 106 and conduit 54 by a pump 107. Disposed within conduit 106 is a valve 108 under the control of a solenoid 110. Energization of the fluid feed pump 107 and of solenoid 110 to open valve 108 occurs along with de-energization of solenoid 58 to effect closing of valve 56.

Reversible motor 94 enables selective mechanical rotation of the rotor shaft to produce any desired phase angle shift between the primary and secondary circuits.

In summation, the operating capabilities and functions of the subject apparatus are as follows:

(1) The interchange of electrical energy from a primary circuit to a secondary circuit, and the reverse when required, at a fixed voltage ratio;

(2) The interchange of electrical energy from a primary circuit to a secondary circuit, and the reverse when required, when the frequency of the primary circuit is different than that of the secondary circuit; this is accomplished by the unlocking of the rotor and permitting its rotation to compensate for the difference in the electrical speeds between the primary and secondary circuits;

(3) Instantaneous interruption of the interchange of electrical energy between the primary and secondary circuits, thereby eliminating the need for and use of electrical circuit breakers; this is accomplished by the hydraulic release of the rotor from its upper to its lower position;

(4) The provision of an auxiliary secondary circuit to replace the main secondary circuit upon interruption of the latter and thereby protect the primary circuit from complete loss of applied load;

(5) The engagement of an external load with a power supply circuit without requiring the usual slow and cautious synchronizing procedure; this is accomplished by hydraulically raising the rotor in unlocked condition from its lower position to its normal and raised operating position, which can be done without synchronizing the two circuits;

(6) The producing of any desirable phase angle shift between the primary and secondary circuits; this is accomplished by mechanically rotating the rotor shaft by a reversible drive motor;

(7) The synchronizing of primary and secondary circuits; this is accomplished, after raising the rotor to its normal position and effecting load transfer from one circuit to the other, by a locking of the rotor to bring the two circuits into synchronism.

What is claimed is:

1. In electrical energy transforming apparatus including annular and concentrically disposed magnetic inner and outer cores having polyphase windings, support means stationarily supporting the outer core, and a shaft mounted for rotation and fixedly supporting the inner core for rotation in radial alignment with the outer core, the improvement comprising the combination therewith of: means adapting the winding of the inner core for connection to a power circuit, means adapting the winding of the outer core for connection to a load circuit, and means for moving said shaft to and fro in endwise directions to move said inner core into and out of radial and magnetic alignment with the outer core to thereby, respectively, connect and disconnect said circuits.

2. The combination of claim 1 including means responsive to the connecting of said circuits and to the existence of an asynchronous frequency condition between said circuits to permit free rotation of said shaft.

3. The combination of claim 2 including means for locking said shaft against rotation to thereby synchronize the frequency of said power circuit with the frequency of said load circuit.

4. The combination of claim 3 including means for selectively and mechanically rotating said shaft to produce a predetermined phase angle shift between the synchronized frequencies of said circuits.

5. In electrical energy transforming apparatus, the combination comprising annular and concentrically disposed magnetic inner and outer cores having polyphase windings, support means stationarily supporting the outer core, a shaft mounted for rotation and fixedly supporting the inner core for rotation in radial alignment with the outer core, means adapting the winding of the inner core for connection to a power circuit, means adapting the winding of the outer core for connection to a load circuit, means for moving said shaft to and fro in endwise directions to move said inner core into and out of radial and magnetic alignment with the outer core to thereby, respectively connect and disconnect said circuits, a second annular magnetic outer core stationarily supported by said support means in spaced and vertical alignment with said first-mentioned outer core, said second outer core having a polyphase winding, means adapting the winding of said second outer core for connection to a second load circuit, and means for disposing said inner core in radial and magnetic alignment with said second outer core to connect said power circuit with said second load circuit upon disconnection of said power circuit from said first-mentioned load circuit.

6. The combination of claim 5, further including a second annular magnetic inner core supported by said shaft in spaced alignment with said first-mentioned inner core, and means for disposing said second inner core in radial and magnetic alignment with said first-mentioned outer core when said first-mentioned inner core is disposed in radial and magnetic alignment with said second outer core.

7. In electrical energy transforming apparatus, the combination comprising first and second annular and concentrically disposed magnetic cores having polyphase windings, means fixedly supporting said first core, a shaft mounted for rotation and fixedly supporting said second core for rotation in radial alignment with said first core, means adapting the winding of one of said cores for connection to a power circuit, means adapting the winding of the other of said cores for connection to a load circuit, means for moving said shaft to and fro in endwise directions to move said second core into and out of radial and magnetic alignment with the first core to thereby, respectively, connect and disconnect said circuits, means responsive to the connecting of said circuits and to the existence of an asynchronous frequency condition between said circuits to permit free rotation of such shaft, and means for locking said shaft against rotation to thereby synchronize the frequency of said power circuit with the frequency of said load circuit.

8. The combination of claim 7, further including means for selectively and mechanically rotating said shaft to produce a predetermined phase angle shift between the synchronized frequencies of said circuits.

References Cited

UNITED STATES PATENTS

| 2,288,035 | 6/1942 | Somes | 336—121 X |
| 2,452,862 | 11/1948 | Neff | 323—52 X |
| 2,509,425 | 5/1950 | Fagen | 336—121 X |
| 3,351,850 | 11/1967 | Crawford et al. | 323—51 |

OTHER REFERENCES

"Multipurpose Sensor Has Floating Rotor" by S. A. Cory; Control Engineering, vol. 14, No. 2, February 1967 (page 95).

JOHN F. CROUCH, Primary Examiner

G. GOLDBERG, Assistant Examiner

U.S. Cl. X.R.

323—53; 331—135; 336—120, 121